(12) United States Patent
Venkataramani (10) Patent No.: US 12,013,940 B2
(45) Date of Patent: Jun. 18, 2024

(54) AUTOMATIC DETECTION OF SOFTWARE THAT PERFORMS UNAUTHORIZED PRIVILEGE ESCALATION

(71) Applicant: McAfee, LLC, San Jose, CA (US)

(72) Inventor: Eknath Venkataramani, Beaverton, OR (US)

(73) Assignee: McAfee, LLC, San Jose, CA (US)

(*) Notice: Subject to any disclaimer, the term of this patent is extended or adjusted under 35 U.S.C. 154(b) by 655 days.

(21) Appl. No.: 17/087,353

(22) Filed: Nov. 2, 2020

(65) Prior Publication Data

US 2021/0049276 A1     Feb. 18, 2021

Related U.S. Application Data

(63) Continuation of application No. 15/877,418, filed on Jan. 23, 2018, now Pat. No. 10,824,725.

(Continued)

(51) Int. Cl.
    *G06F 21/56*      (2013.01)
    *G06F 9/46*      (2006.01)
    (Continued)

(52) U.S. Cl.
    CPC ............ *G06F 21/566* (2013.01); *G06F 9/468* (2013.01); *G06F 9/542* (2013.01);
    (Continued)

(58) Field of Classification Search
    CPC ........ G06F 21/566; G06F 9/468; G06F 9/542; G06F 12/1491; G06F 21/554;
    (Continued)

(56) References Cited

U.S. PATENT DOCUMENTS 6,266,773 B1    7/2001   Kisor et al.
7,565,549 B2    7/2009   Satterlee et al.
(Continued)

OTHER PUBLICATIONS

Yang et al., "Research on Non-Authorized Privilege Escalation Detection of Android Applications", 17th IEEE/ACIS International Conference on Software Engineering, Artificial Intelligence, Networking and Parallel/Distributed Computing, Jun. 2016, pp. 563-568 (Year: 2016).*

(Continued)

*Primary Examiner* — Kenneth W Chang
(74) *Attorney, Agent, or Firm* — Hanley, Flight & Zimmerman, LLC (57) ABSTRACT

Automatic detection of software that performs unauthorized privilege escalation is disclosed. Examples disclosed herein include detecting, in an event log, a first event associated with a start of execution of a process, the first event to identify a first privilege level associated with the process, and storing the first privilege level in a data structure associated with the process. Disclosed examples also include detecting, in the event log by executing an instruction with the at least one processor, a subsequent second event associated with the execution of the process, the second event to identify a second privilege level associated with the process. Disclosed examples further include at least one of terminating, pausing or suspending the process in response to the second privilege level being higher than the first privilege level.

20 Claims, 4 Drawing Sheets

Related U.S. Application Data (60) Provisional application No. 62/474,193, filed on Mar. 21, 2017.

(51) Int. Cl.

| | | |
|---|---|---|
| *G06F 9/54* | (2006.01) | |
| *G06F 12/14* | (2006.01) | |
| *G06F 21/55* | (2013.01) | |
| *G06F 21/57* | (2013.01) | |
| *G06F 21/62* | (2013.01) | |
| *H04L 9/40* | (2022.01) | |

(52) U.S. Cl.
CPC ........ *G06F 12/1491* (2013.01); *G06F 21/554* (2013.01); *G06F 21/577* (2013.01); *G06F 21/6281* (2013.01); *H04L 63/1408* (2013.01); *G06F 2221/2113* (2013.01)

(58) Field of Classification Search
CPC .............. G06F 21/577; G06F 21/6281; G06F 2221/2113; H04L 63/1408
See application file for complete search history.

(56) References Cited

U.S. PATENT DOCUMENTS

| | | | | |
|---|---|---|---|---|
| 7,680,999 | B1* | 3/2010 | Morris | .................. G06F 9/468 |
| | | | | 711/158 |
| 8,442,960 | B1 | 5/2013 | Meyer et al. | |
| 8,656,465 | B1 | 2/2014 | Fong-Jones | |
| 10,565,378 | B1* | 2/2020 | Vincent | ................. G06F 21/566 |
| 2007/0079358 | A1 | 4/2007 | Lambert et al. | |
| 2007/0199068 | A1 | 8/2007 | Russinovich et al. | |
| 2009/0271863 | A1 | 10/2009 | Govindavajhala et al. | |
| 2009/0300532 | A1 | 12/2009 | Cowan | |
| 2010/0257596 | A1* | 10/2010 | Ngo | ........................ H04L 63/08 |
| | | | | 726/7 |
| 2011/0030036 | A1* | 2/2011 | Wells, Jr. | ............ G06F 21/6281 |
| | | | | 711/216 |
| 2011/0154505 | A1 | 6/2011 | Cowan et al. | |
| 2012/0272322 | A1 | 10/2012 | Pistoia et al. | |
| 2012/0317247 | A1* | 12/2012 | Dattagupta | ......... H04L 12/2807 |
| | | | | 709/220 |
| 2012/0331464 | A1* | 12/2012 | Saito | ................... G06F 9/45533 |
| | | | | 718/1 |
| 2013/0055145 | A1* | 2/2013 | Antony | ................ G05B 23/024 |
| | | | | 715/781 |
| 2014/0351810 | A1 | 11/2014 | Pratt et al. | |
| 2014/0351930 | A1 | 11/2014 | Sun et al. | |
| 2016/0335151 | A1* | 11/2016 | Swierk | .................... G06F 21/50 |
| 2016/0378962 | A1* | 12/2016 | Austin | .................. G06F 21/335 |
| | | | | 726/17 |
| 2016/0381027 | A1* | 12/2016 | Mitchell | ............ G06F 11/3062 |
| | | | | 726/3 |
| 2017/0244729 | A1* | 8/2017 | Fahrny | ................ H04L 63/0823 |
| 2018/0276383 | A1 | 9/2018 | Venkataramani | |

OTHER PUBLICATIONS

Jaafar et al., "A Systematic Approach for Privilege Escalation Prevention," IEEE International Conference on Software Quality, Reliability and Security Companion, 2016, 8 pages.

Anthony et al., "Detecting Security Incidents Using Windows Workstation Event Logs," SANS Institute InfoSec Reading Room, Jun. 19, 2013, 30 pages. Retrieved from: https://www.sans.org/reading-room/whitepapers/logging/detecting-security-incidents-windows-workstation-event-logs-34262.

Lelonek et al., "Make ETW Great Again. Exploring some of the many uses of Event Tracing for Windows (ETW)," CyberPoint Security Research Team, 2016, 43 pages.

International Bureau, "International Preliminary Report on Patentability," mailed in connection with International Patent Application No. PCT/US2018/14882, dated Sep. 24, 2019, 7 pages.

International Searching Authority, "Search Report and Written Opinion," mailed in connection with International Patent Application No. PCT/US2018/14882, dated Apr. 9, 2018, 14 pages.

United States Patent and Trademark Office, "Notice of Allowance," mailed in connection with U.S. Appl. No. 15/877,418, dated Jul. 24, 2020, 15 pages.

United States Patent and Trademark Office, "Final Office Action," mailed in connection with U.S. Appl. No. 15/877,418, dated May 11, 2020, 14 pages.

United States Patent and Trademark Office, "Non-final Office Action," mailed in connection with U.S. Appl. No. 15/877,418, dated Oct. 30, 2019, 26 pages.

\* cited by examiner

AUTOMATIC DETECTION OF SOFTWARE THAT PERFORMS UNAUTHORIZED PRIVILEGE ESCALATION

RELATED APPLICATION(S)

This patent arises from a continuation of U.S. patent application Ser. No. 15/877,418, which is titled "AUTOMATIC DETECTION OF SOFTWARE THAT PERFORMS UNAUTHORIZED PRIVILEGE ESCALATION," and which was filed on Jan. 23, 2018, which claims the benefit of U.S. Provisional Patent Application No. 62/474,193, which was filed on Mar. 21, 2017. Priority to U.S. patent application Ser. No. 15/877,418 and U.S. Provisional Patent Application No. 62/474,193 is claimed. U.S. patent application Ser. No. 15/877,418 and U.S. Provisional Patent Application No. 62/474,193 are incorporated by reference herein in their respective entireties.

TECHNICAL FIELD

Embodiments described herein generally relate to computer security and privacy and, more particularly, to automatic detection of software that performs unauthorized privilege escalation.

BACKGROUND ART

The field of computer network security has become increasingly important and complicated in today's society. Computer network environments are configured for virtually every enterprise or organization, typically with multiple interconnected computers (e.g., end user computers, laptops, servers, printing devices, etc.). In many such enterprises, Information Technology (IT) administrators may be tasked with maintenance and control of the network environment, including executable software files (e.g., web application files) on hosts, servers, and other network computers. As the number of executable software files in a network environment increases, the ability to control, maintain, and remediate these files efficiently can become more difficult. Furthermore, computer and communications networks today encompass mobile devices such as smartphones, tablet computers and the like, which allow users to download and install applications on these devices quickly and with minimal oversight. Thus, innovative tools are needed to assist IT administrators in the effective control and management of applications on mobile devices within computer and communication network environments. Such tools may include tools for automatic detection of unauthorized privilege escalation.

Privilege escalation may be either vertical or horizontal. Vertical privilege escalation occurs when a process runs with higher privileges than it was originally intended to, for example a web browser running with System-level privileges. Horizontal privilege escalation occurs when a process initially run with user A's privileges is now running as user B. For example, a web application may connect to databases using different user privileges than the ones used to start the web application.

Privilege escalation is commonly used to allow software to run with a least set of privileges needed for common tasks and then request access to additional privileges (e.g., escalate) if those privileges are needed. These privileges may include installing software and drivers, changing system-wide settings, viewing or changing other user accounts, and running administrative tools. As an example of privilege escalation, a piece of software may typically run in the context of a standard user of the device. If an additional component of the software is needed, the software may attempt to install the additional component. However, the standard user may not have permissions to install software. When the software attempts to install the additional component, an operating system (OS) component, such as User Account Control on Microsoft Windows® (Windows is a registered trademark owned by Microsoft Corporation), may prompt the user to authorize the software to access privileged permissions. A user, such as an administrator, may then grant access. The software may then install the additional component.

Requiring software request escalated privileges helps contain malicious software (e.g., malware) if such software does make its way onto a device by limiting the tasks that may be performed. Malware may then attempt to obtain access to protected or privileged resources of a device through an unauthorized privilege escalation.

DESCRIPTION OF EMBODIMENTS

In the following description, for purposes of explanation, numerous specific details are set forth in order to provide a thorough understanding of the inventions. It will be apparent, however, to one skilled in the art that the inventions may be practiced without these specific details. In other instances, structure and devices are shown in block diagram form in order to avoid obscuring the inventions. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of an invention, and multiple references to "one embodiment" or "an embodiment" should not be understood as necessarily all referring to the same embodiment.

As used herein, the term "a programmable device" can refer to a single programmable device or a plurality of programmable devices working together to perform the function described as being performed on or by the programmable device. Similarly, "a machine-readable medium" can refer to a single physical medium or a plurality of media that together may store the material described as being stored on the machine-readable medium.

As used herein, the term "a computer system" can refer to a single computer or a plurality of computers working together to perform the function described as being performed on or by a computer system.

As indicated above, privacy and security tools may be configured to generally detect unauthorized privilege escalation. Identifying unauthorized privilege escalation techniques in a generic way is difficult as by definition unauthorized privilege escalations occurred in an unintended way, for example, due to a software vulnerability or a misconfiguration of the operating system. Identifying unauthorized privilege escalation is generally a reactive process performed by observing known privilege escalation techniques to determine characteristics of the technique to watch out for or how to patch the issue. Thus there is a need for a proactive approach that is generic and is universally applicable. Such an approach should not require any invasive techniques that will hamper user experience, nor utilize intercepting or modifying any operating system control flows. Preferably, a generic approach to detecting privilege escalation would utilize lightweight and well-supported features of modern operating systems to generically identify such activity.

One such approach may utilize event logging and tracing functionality commonly provided by modern operating systems. Event logging and tracing functionality are typically tools used to log system and application events for use in debugging or troubleshooting. Events may be generated by system processes when an application attempts to access or utilize various system resources, such as a storage system, access to certain APIs, etc. The events contain, among other information, information indicating the privilege level of executing processes. Running processes and their privilege levels may be stored and tracked over time. Where the privilege level of a process changes without an indication that the privilege escalation was authorized, such as through User Account Control, then the privilege escalation was unauthorized and process may be stopped.

Figure 1:
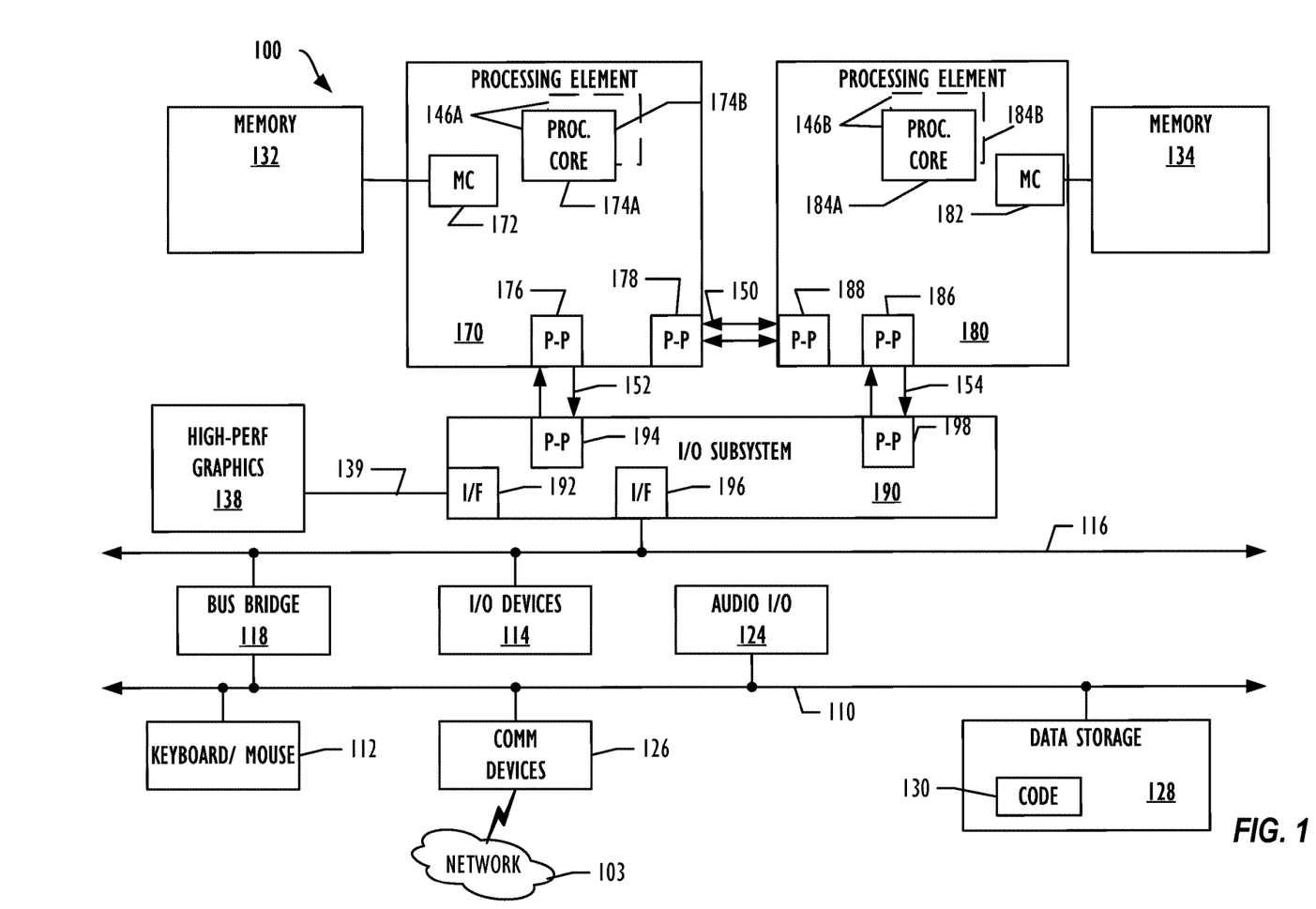
FIG. 1 is a block diagram illustrating a programmable device, according to one embodiment.

Referring now to FIG. 1, a block diagram illustrates a programmable device 100 that may be used for implementing the techniques described herein in accordance with one embodiment. The programmable device 100 illustrated in FIG. 1 is a multiprocessor programmable device that includes a first processing element 170 and a second processing element 180. While two processing elements 170 and 180 are shown, an embodiment of programmable device 100 may also include only one such processing element.

Programmable device 100 is illustrated as a point-to-point interconnect system, in which the first processing element 170 and second processing element 180 are coupled via a point-to-point interconnect 150. Any or all of the interconnects illustrated in FIG. 1 may be implemented as a multidrop bus rather than point-to-point interconnects.

As illustrated in FIG. 1, each of processing elements 170 and 180 may be multicore processors, including first and second processor cores (i.e., processor cores 174a and 174b and processor cores 184a and 184b). Such cores 174a, 174b, 184a, 184b may be configured to execute instruction code. However, other embodiments may use processing elements that are single core processors as desired. In embodiments with multiple processing elements 170, 180, each processing element may be implemented with different numbers of cores as desired.

Each processing element 170, 180 may include at least one shared cache 146. The shared cache 146a, 146b may store data (e.g., instructions) that are utilized by one or more components of the processing element, such as the cores 174a, 174b and 184a, 184b, respectively. For example, the shared cache may locally cache data stored in a memory 132, 134 for faster access by components of the processing elements 170, 180. In one or more embodiments, the shared cache 146a, 146b may include one or more mid-level caches, such as level 2 (L2), level 3 (L3), level 4 (L4), or other levels of cache, a last level cache (LLC), or combinations thereof.

While FIG. 1 illustrates a programmable device with two processing elements 170, 180 for clarity of the drawing, the scope of the present inventions are not so limited and any number of processing elements may be present. Alternatively, one or more of processing elements 170, 180 may be an element other than a processor, such as an graphics processing unit (GPU), a digital signal processing (DSP) unit, a field programmable gate array, or any other programmable processing element. Processing element 180 may be heterogeneous or asymmetric to processing element 170. There may be a variety of differences between processing elements 170, 180 in terms of a spectrum of metrics of merit including architectural, microarchitectural, thermal, power consumption characteristics, and the like. These differences may effectively manifest themselves as asymmetry and heterogeneity amongst processing elements 170, 180. In some embodiments, the various processing elements 170, 180 may reside in the same die package.

First processing element 170 may further include memory controller logic (MC) 172 and point-to-point (P-P) interconnects 176 and 178. Similarly, second processing element 180 may include a MC 182 and P-P interconnects 186 and 188. As illustrated in FIG. 1, MCs 172 and 182 couple processing elements 170, 180 to respective memories, namely a memory 132 and a memory 134, which may be portions of main memory locally attached to the respective processors. While MC logic 172 and 182 is illustrated as integrated into processing elements 170, 180, in some embodiments the memory controller logic may be discrete logic outside processing elements 170, 180 rather than integrated therein.

Processing element 170 and processing element 180 may be coupled to an I/O subsystem 190 via respective P-P interconnects 176 and 186 through links 152 and 154. As illustrated in FIG. 1, I/O subsystem 190 includes P-P interconnects 194 and 198. Furthermore, I/O subsystem 190 includes an interface 192 to couple I/O subsystem 190 with a high performance graphics engine 138. In one embodiment, a bus (not shown) may be used to couple graphics engine 138 to I/O subsystem 190. Alternately, a point-to-point interconnect 139 may couple these components.

In turn, I/O subsystem 190 may be coupled to a first link 116 via an interface 196. In one embodiment, first link 116 may be a Peripheral Component Interconnect (PCI) bus, or a bus such as a PCI Express bus or another I/O interconnect bus, although the scope of the present inventions are not so limited.

As illustrated in FIG. 1, various I/O devices 114, 124 may be coupled to first link 116, along with a bridge 118 that may couple first link 116 to a second link 110. In one embodiment, second link 110 may be a low pin count (LPC) bus. Various devices may be coupled to second link 120 including, for example, a keyboard/mouse 112, communication device(s) 126 (which may in turn be in communication with the computer network 103), and a data storage unit 128 such as a disk drive or other mass storage device which may include code 130, in one embodiment. The code 130 may include instructions for performing embodiments of one or more of the techniques described above. Further, an audio I/O 124 may be coupled to second link 110.

Note that other embodiments are contemplated. For example, instead of the point-to-point architecture of FIG. 1, a system may implement a multi-drop bus or another such communication topology. Although links 116 and 120 are illustrated as busses in FIG. 1, any desired type of link may be used. In addition, the elements of FIG. 1 may alternatively be partitioned using more or fewer integrated chips than illustrated in FIG. 1.

Figure 2:
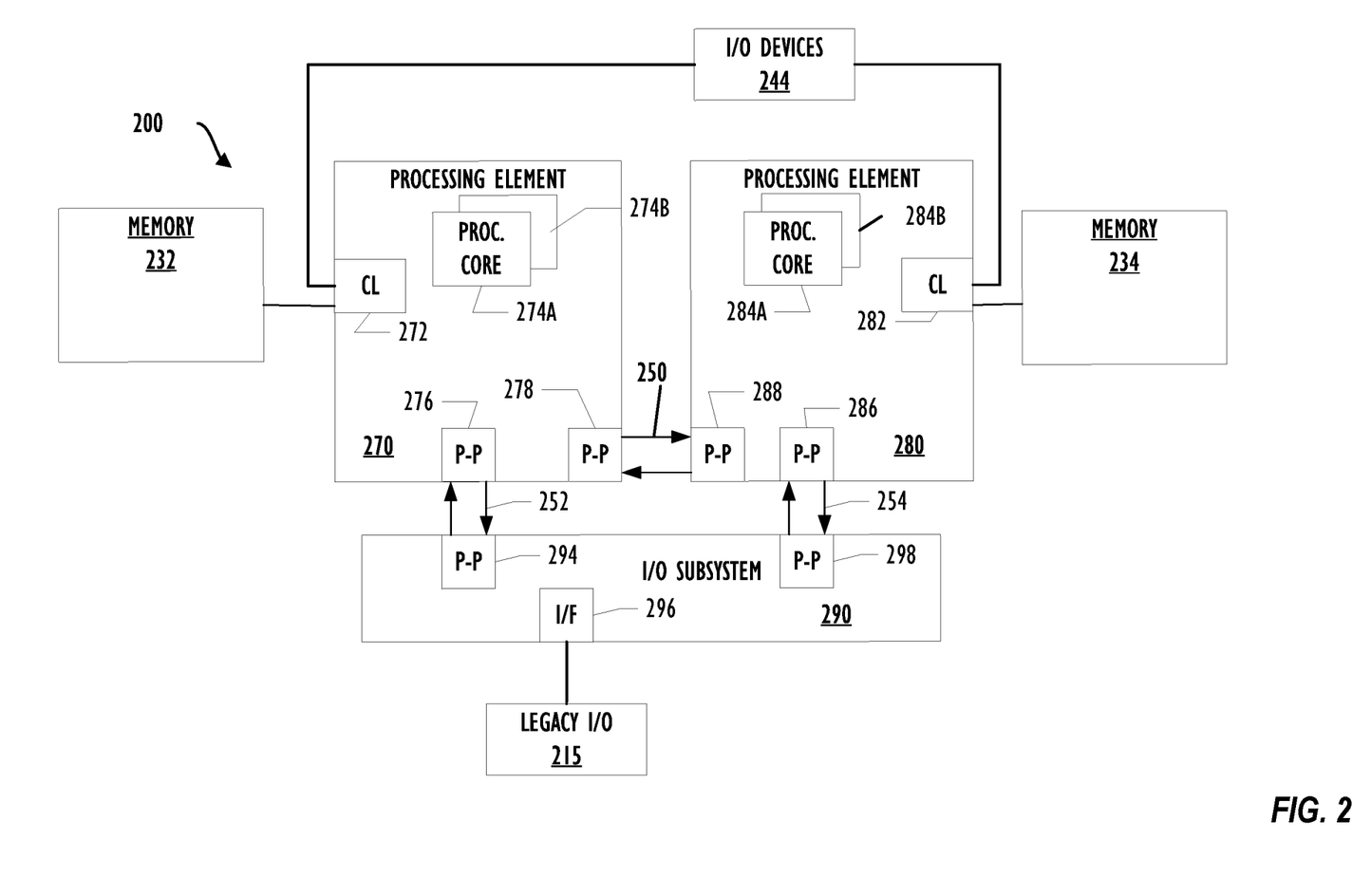
FIG. 2 is a block diagram illustrating a programmable device, according to one embodiment.

Referring now to FIG. 2, a block diagram illustrates a programmable device 200 according to another embodiment. Certain aspects of FIG. 2 have been omitted from FIG. 2 in order to avoid obscuring other aspects of FIG. 2.

FIG. 2 illustrates that processing elements 270, 280 may include integrated memory and I/O control logic ("CL") 272 and 282, respectively. In some embodiments, the 272, 282 may include memory control logic (MC) such as that described above in connection with FIG. 1. In addition, CL 272, 282 may also include I/O control logic. FIG. 2 illustrates that not only may the memories 232, 234 be coupled to the CL 272, 282, but also that I/O devices 244 may also be coupled to the control logic 272, 282. Legacy I/O devices 215 may be coupled to the I/O subsystem 290 by interface 296. Each processing element 270, 280 may include multiple processor cores, illustrated in FIG. 2 as processor cores 274A, 274B, 284A and 284B. As illustrated in FIG. 2, I/O subsystem 290 includes point-to-point (P-P) interconnects 294 and 298 that connect to P-P interconnects 276 and 286 of the processing elements 270 and 280 with links 252 and 254. Processing elements 270 and 280 may also be interconnected by link 250 and interconnects 278 and 288, respectively.

The programmable devices depicted in FIGS. 1 and 2 are schematic illustrations of embodiments of programmable devices that may be utilized to implement various embodiments discussed herein. Various components of the programmable devices depicted in FIGS. 1 and 2 may be combined in a system-on-a-chip (SoC) architecture.

Modern operating systems include event logging and tracing functionality (also referred to as profiling), such as Microsoft Event Tracing for Windows® (ETW) and pnotify for Linux® (Linux is a registered trademark owned by Torvald, Linus). Process profiling features generally are present in many operating systems and these profiling features may contain information, in the form of events, about the process path, process id and the privilege level of executing processes.

Figure 3:
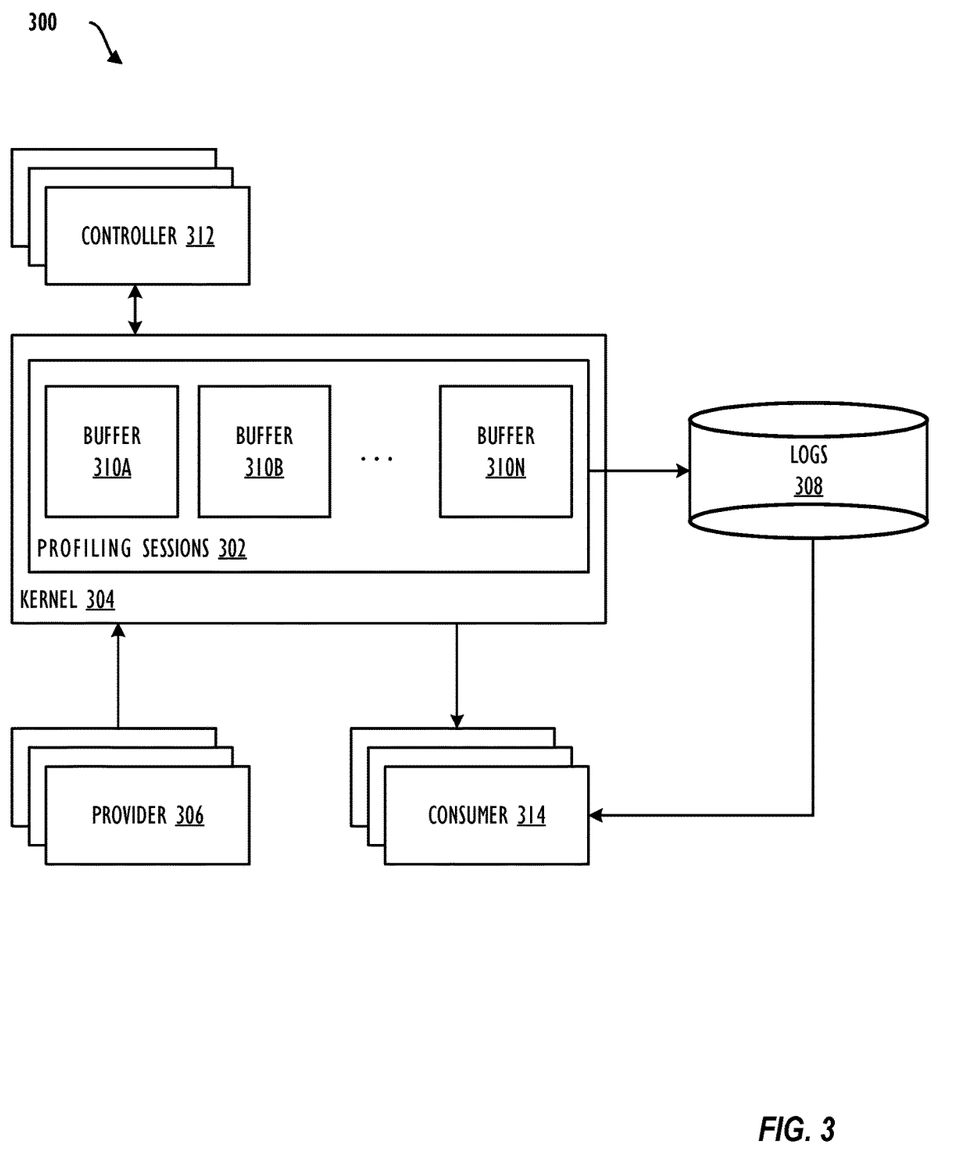
FIG. 3 is a block diagram illustrating a system for event tracing, in accordance with aspects of the present disclosure.

FIG. 3 is a block diagram illustrating a system 300 for process profiling, in accordance with aspects of the present disclosure. The system 300 includes one or more profiling sessions 302 which may generally execute in kernel 304 as kernel level processes. Each profiling session may have one or more buffers 310A-310N to receive and store events prior to storage in one or more logs 308. One or more providers 306 provide events for logging. Examples of providers include OS components, kernel mode drivers, and applications. Generally, OS components will generate events at least when important changes in the OS state occur, such as launching a new application, writing to storage, attempting to access another process, attempting to access restricted memory spaces, or when a process attempts to obtain authorization for privilege escalation. Application processes also may be configured with instrumentation and registered as a provider to take advantage of event tracing, for example, for debugging, analysis, or monitoring. The type and location of instrumentation within a particular application may be determined by the application developer.

The system 300 also includes controllers 312 which enable the one or more providers 306 to provide events and start and stop process profiling sessions 302. Information provided about events are generally recorded in one or more logs 308 which the providers 306 are able to write events to.

The logs 308, in some cases, may also execute as kernel level processes in kernel 304. The logs 308 generally provide near real-time process and thread-related events and provide a behavioral trace of processes running for a given device. These events are delivered asynchronously so the target application continues execution without being blocked and is generally transparent to applications. Events may be received by one or more consumers 314. Stored events may be received from the logs 308, or a consumer 314 may register with one or more event tracing sessions 302 to receive events delivered in real time, for example, by receiving a callback from an application programming interface (API).

As the behavior trace includes privilege level information related to running applications and is populated in real-time and with little performance impact, the trace may be monitored to see if any target processes are running inappropriately with escalated privileges. Where a process is running at an escalated privilege level, such as a privilege level higher than the current user, a determination may be made if there was an unauthorized privilege escalation.

Figure 4:
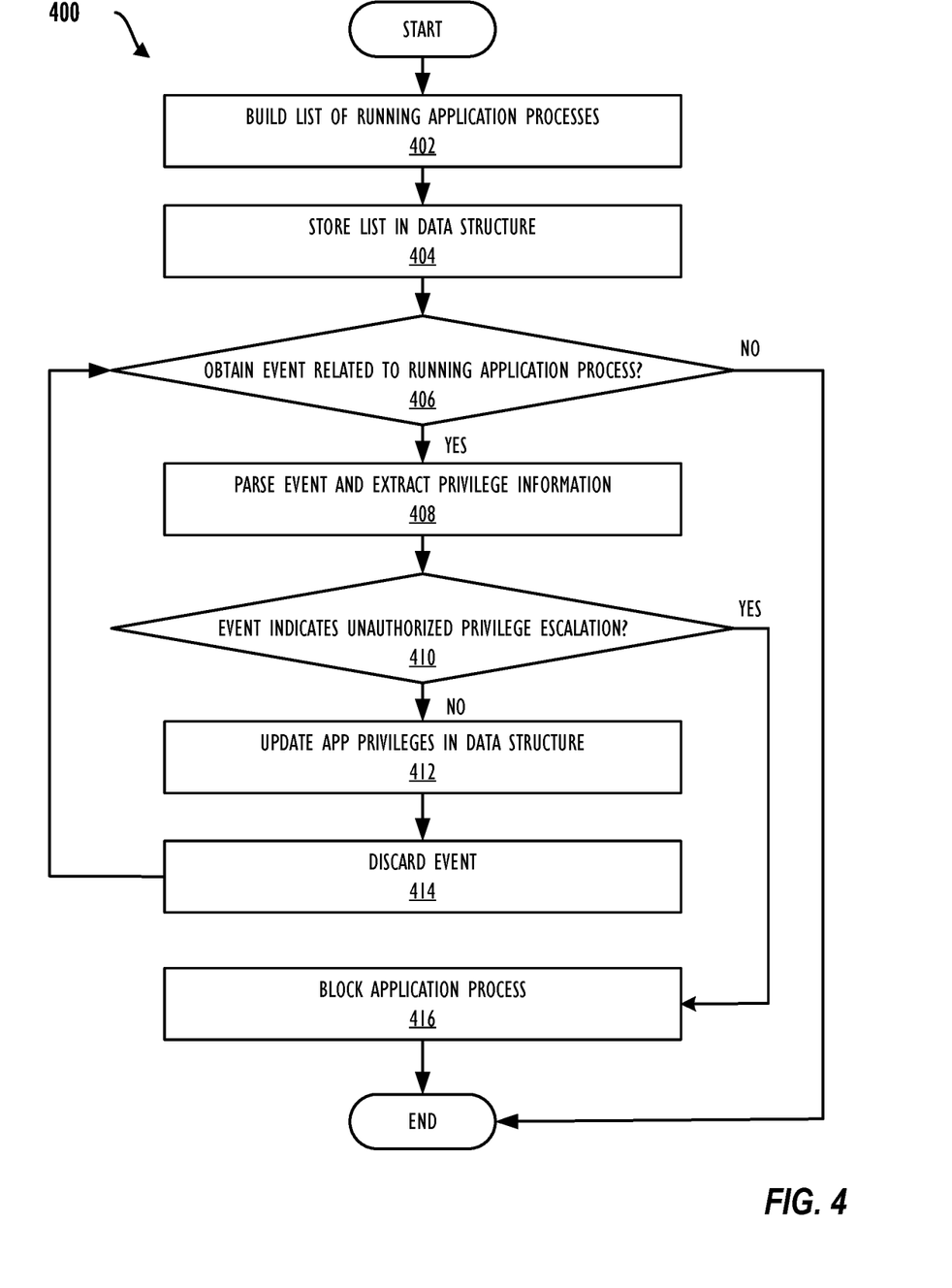
FIG. 4 is flowchart illustrating a method for automatic detection of software that performs unauthorized privilege escalation, according to one embodiment.

FIG. 4 is flowchart illustrating a method 400 for automatic detection of software that performs unauthorized privilege escalation, according to one embodiment. The method 400 operates on events recorded by a process profiling system such as described above in the discussion of FIG. 3. For example, an unauthorized escalation detector implementing the method 400 may register to receive callbacks from a process profiling API or monitor logs generated by the process profiling system to see if an event is recorded in the monitored logs. At block 402, application information for application processes running on a computing device is obtained to build a list of application processes. For example, the unauthorized escalation detector, when initially started, may utilize a task list API to obtain a listing of the application processes currently running as well as information indicating a privilege level associated with each application process. When new application processes are run, an event is generated by the operating system. After the unauthorized escalation detector is started, an event indicating that a new application process is run may be detected and a record for the new application process may be added to a data structure. This data structure may be any data structure capable of associating information identifying a process, such as a process ID, and privilege level information. The data structure may also include an indication that the process has been authorized to run at an escalated privilege level. When applications are closed, records associated with the closed application processes may be removed. At block 404, the obtained list of application processes along with associated privilege level information is stored in the data structure. The unauthorized escalation detector may maintain the data structure tracking the application processes running on the computing device associated with information indicating the privilege level the application processes are running at. The data structure may be maintained in memory, in a persistent storage system, or any combination thereof.

At block 406, a determination is made whether an event has been obtained. Once an event is generated, the event may be reported by the process profiling API or the event may be retrieved from the monitored log. At block 408, the event may be parsed to determine what application process the event is related to and to extract privilege level information.

At block 410, a determination is made whether the event indicates that an authorized privilege escalation has been performed for the application process. Application processes generally start and run at a particular privilege level and this privilege level is typically the same as a current user account (or virtual user account if a device is running headless, such as for a server) under which the application processes is run from. Typically, the user account is configured with the least privileges needed to run application processes associated with the user account. The amount of privileges needed by a user account is generally less than that available to an administrator account.

In some cases where a user is interacting with the application process, the user may attempt to utilize a function of the application process that causes the application process to try to escalate the privilege level of the application process. For example, the application process may run normally with standard user privileges. However, for certain features, the application process may need a higher privilege level, such as if the application process needs to install a new component, access kernel space, or memory space of another process. In such cases, the application process may attempt to obtain escalated privileges, for example by prompting for an administrator or other higher privileged account credentials using Windows® User Account Control (UAC) or sudo (superuser do, or switch user do) command in Linux®.

A privilege escalation request, such as an attempt to access certain APIs, triggering UAC or sudo may cause events to be generated indicating that the application process is attempting to escalate. Additional events may be triggered where the escalation is successful or if escalation fails. If higher privileged credentials are received, then the application process is escalated in an authorized way. The application process, while running at a higher privilege level than the one at which the application process was started at, is running at an expected privilege level in this case.

At block 412, the data structure is updated with an indication that the application process has obtained escalated privileges. For example, the privilege information in the data structure may be updated with the escalated privilege level. In such a case execution may proceed to block 414, where the event is discarded and execution proceeds back to 406 when another event is obtained.

At block 416, a determination is made whether the privilege level associated with the event is higher than the expected privilege level. For example, the privilege level associated with the application process in the event may be compared to the privilege level for the application process in the data structure. If the privilege level in the event is greater than the privilege level in the data structure, then an unauthorized privilege escalation has occurred and execution proceeds to block 416. If the privilege level in the event is the same as the privilege level in the data structure, then execution may proceed to block 414, where the event is discarded and execution proceeds back to 406 where another event may be obtained.

At block 416, the application process is blocked and a report generated. The report may be any type of user notification system, such as logging, sending a notification, email, or other notification technique. The application process may be blocked, for example, by terminating, pausing, or suspending the application process.

The following examples pertain to further embodiments which may be, but are not necessarily, implemented in conjunction with each other and/or other embodiments described above and in the accompanying figures.

Example 1 is a machine readable medium, on which are stored instructions for detecting unauthorized privilege escalation, comprising instructions that when executed cause a programmable device to, obtain a first event associated with a process from an event logger, parse the first event to determine a first privilege level for the process, compare the first privilege level for the process to an expected privilege level, and block execution of the process if the first privilege level for the process is higher than the expected privilege level.

In Example 2, the subject matter of Example 1 optionally includes wherein the event logger is built into an operating system and the event logger is a kernel level process.

In Example 3, the subject matter of Example 1 optionally includes wherein the expected privilege level is based on a second privilege level associated with a current account.

In Example 4, the subject matter of Example 1 optionally includes wherein the instructions further comprise instructions that when executed cause the programmable device to retrieve the expected privilege level from a memory.

In Example 5, the subject matter of Example 4 optionally includes wherein the instructions further comprise instructions that when executed cause the programmable device to: obtain a second event associated with the process indicative of a successful authorized privilege escalation request, obtain an indication of a third privilege level of the process, and update the expected privilege level based on the second event and the third privilege level.

In Example 6, the subject matter of Example 5 optionally includes wherein the instructions that when executed cause the programmable device to obtain the indication of the third privilege level from the second event.

In Example 7, the subject matter of Example 1 optionally includes wherein the instructions that when executed cause the programmable device to block execution of the process comprises instruction that when executed cause a programmable device to terminate or pause the process.

In Example 8 is a method for detecting unauthorized privilege escalation, the method comprising: obtaining a first event associated with a process from an event logger, parsing the first event to determine a first privilege level for the process, comparing the first privilege level for the process to an expected privilege level, and blocking execution of the process if the first privilege level for the process is higher than the expected privilege level.

In Example 9, the subject matter of Example 8 optionally includes wherein the event logger is built into an operating system and the event logger is a kernel level process.

In Example 10, the subject matter of Example 8 optionally includes wherein the expected privilege level is based on a second privilege level associated with a current user account.

In Example 11, the subject matter of Example 8 optionally includes retrieving the expected privilege level from a memory.

In Example 12, the subject matter of Example 11 optionally includes obtaining a second event associated with the process indicative of a successful authorized privilege escalation request: obtaining an indication of a third privilege level of the process, and updating the expected privilege level based on the second event and the third privilege level.

Example 13, the subject matter of Example 12 optionally includes obtaining the indication comprises obtaining the indication of the third privilege level from the second event.

In Example 14, the subject matter of Example 8 optionally includes blocking execution of the process comprises terminating or pausing the process.

Example 15 is an apparatus for detecting unauthorized privilege escalation, the apparatus comprising a memory storing instructions for detecting unauthorized privilege escalation and a processor operatively coupled to the memory and adapted to execute the instructions stored in the memory to cause the processor to, obtain a list of processes and privilege levels of the processes running on the apparatus, determine an expected privilege level for a process based on the list of processes and privilege levels of the processes, obtain a first event associated with the process from an event logger, parse the first event to determine a first privilege level for the process, compare the first privilege level for the process to the expected privilege level, and block execution of the process if the first privilege level for the process is higher than the expected privilege level.

In Example 16, the subject matter of Example 15 optionally includes wherein the event logger is built into an operating system and the event logger is a kernel level process.

In Example 17, the subject matter of Example 15 optionally includes wherein the expected privilege level is based on a second privilege level associated with a current account.

In Example 18, the subject matter of Example 15 optionally includes wherein the instructions stored in the memory further cause the processor to retrieve the expected privilege level from storage.

In Example 19, the subject matter of Example 18 optionally includes wherein the instructions stored in the memory further cause the processor to: obtain a second event associated with the process indicative of a successful authorized privilege escalation request, and obtain an indication of a third privilege level of the process, update the expected privilege level based on the second event and the third privilege level.

In Example 20, the subject matter of Example 19 optionally includes wherein the instructions stored in the memory further cause the processor to obtain the indication of the third privilege level from the second event.

It is to be understood that the above description and the accompanying figures are intended to be illustrative, and not restrictive. For example, the above-described embodiments may be used in combination with each other. Many other embodiments will be apparent to those of skill in the art upon reviewing the above description and the accompanying figures. The scope of the inventions therefore should be determined with reference to the appended claims, along with the full scope of equivalents to which such claims are entitled.

What is claimed is:

1. An article of manufacture comprising computer readable instructions to cause at least one processor circuit to at least:
   detect a first event associated with a start of execution of a process, the first event to identify a first privilege level associated with the process;
   cause storage of the first privilege level in a data structure associated with the process;
   detect a second event associated with the execution of the process, the second event subsequent to the first event, the second event to identify a second privilege level associated with the process;
   determine the second privilege level is unauthorized based on a combination of (i) the second privilege level being higher than the first privilege level and (ii) association of the process with the second privilege level having occurred without an authorized privilege escalation by an operating system component that is to prompt for user credentials; and
   at least one of terminate, pause or suspend the process after a determination that the second privilege level is unauthorized.

2. The article of manufacture of claim 1, wherein the second event is associated with an attempt by the process to access a system resource.

3. The article of manufacture of claim 1, wherein the first event includes a process identifier to identify the process and first information to identify the first privilege level associated with the process, and the second event includes the process identifier to identify the process and second information to identify the second privilege level associated with the process.

4. The article of manufacture of claim 3, wherein the instructions are to cause one or more of the at least one processor circuit to parse an event log based on the process identifier to detect the first event and the second event.

5. The article of manufacture of claim 1, wherein the instructions are to cause one or more of the at least one processor circuit to:
   detect a third event subsequent to the second event, the third event associated with a successful request to associate the process with a third privilege level higher than the first privilege level; and
   cause replacement of the first privilege level with the third privilege level in the data structure associated with the process.

6. The article of manufacture of claim 5, wherein the instructions are to cause one or more of the at least one processor circuit to:
   detect a fourth event associated with the execution of the process, the fourth event subsequent to the third event, the fourth event to identify a fourth privilege level associated with the process; and
   permit the execution of the process to proceed in response to the fourth privilege level being equal to the third privilege level.

7. The article of manufacture of claim 5, wherein the instructions are to cause one or more of the at least one processor circuit to:
   detect a fourth event associated with the execution of the process, the fourth event subsequent to the third event, the fourth event to identify a fourth privilege level associated with the process; and
   at least one of terminate, pause or suspend the process in response to the fourth privilege level being higher than the third privilege level.

8. An apparatus comprising:
   interface circuitry;
   memory;
   machine-readable instructions; and
   at least one processor circuit to be programmed by the machine-readable instructions to:
     detect, in an event log, a first event associated with a start of execution of a process, the first event to identify a first privilege level associated with the process;
     cause storage of the first privilege level in a data structure associated with the process;
     detect, in the event log, a second event associated with an unsuccessful request to associate the process with a second privilege level higher than the first privilege level;
     detect, in the event log, a third event associated with the execution of the process, the third event subsequent to the first event, the third event to identify a third privilege level associated with the process;

determine the third privilege level is unauthorized based on a combination of (i) the third privilege level being higher than the first privilege level and (ii) association of the process with the third privilege level having occurred without an authorized privilege escalation by an operating system component that is to prompt for user credentials; and at least one of terminate, pause or suspend the process after a determination that the third privilege level is unauthorized.

9. The apparatus of claim 8, wherein the third event is associated with an attempt by the process to access a system resource.

10. The apparatus of claim 8, wherein the first event includes a process identifier to identify the process and first information to identify the first privilege level associated with the process, and the third event includes the process identifier to identify the process and second information to identify the third privilege level associated with the process.

11. The apparatus of claim 10, wherein one or more of the at least one processor circuit is to parse the event log based on the process identifier to detect the first event, the second event and the third event.

12. The apparatus of claim 8, wherein one or more of the at least one processor circuit is to:

detect, in the event log, a fourth event subsequent to the third event, the fourth event associated with a successful request to associate the process with a fourth privilege level higher than the first privilege level; and cause replacement of the first privilege level with the fourth privilege level in the data structure associated with the process.

13. The apparatus of claim 12, wherein one or more of the at least one processor circuit is to:

detect, in the event log, a fifth event associated with the execution of the process, the fifth event subsequent to the fourth event, the fifth event to identify a fifth privilege level associated with the process; and permit the execution of the process to proceed in response to the fifth privilege level being equal to the fourth privilege level.

14. The apparatus of claim 12, wherein one or more of the at least one processor circuit is to:

detect, in the event log, a fifth event associated with the execution of the process, the fifth event subsequent to the fourth event, the fifth event to identify a fifth privilege level associated with the process; and at least one of terminate, pause or suspend the process in response to the fifth privilege level being higher than the fourth privilege level.

15. A method comprising:

detecting, by executing an instruction with at least one processor circuit, a first event associated with a start of execution of a process, the first event to identify a first privilege level associated with the process;

storing the first privilege level in a data structure associated with the process;

detecting, by executing an instruction with one or more of the at least one processor circuit, a privilege escalation event associated with the execution of the process, the privilege escalation event subsequent to the first event, the privilege escalation event to identify a second privilege level associated with the process; and at least one of terminating, pausing or suspending the process after determination that both (i) the second privilege level is higher than the first privilege level and (ii) the privilege escalation event does not correspond to a successful privilege escalation performed by an operating system after a prompt for user credentials.

16. The method of claim 15, wherein the privilege escalation event is associated with an attempt by the process to access a system resource.

17. The method of claim 15, wherein the first event includes a process identifier to identify the process and first information to identify the first privilege level associated with the process, the privilege escalation event includes the process identifier to identify the process and second information to identify the second privilege level associated with the process, and further including parsing an event log based on the process identifier to detect the first event and the privilege escalation event.

18. The method of claim 15, further including:

detecting a third event subsequent to the privilege escalation event, the third event associated with a successful request to associate the process with a third privilege level higher than the first privilege level; and replacing the first privilege level with the third privilege level in the data structure associated with the process.

19. The method of claim 18, further including:

detecting a fourth event associated with the execution of the process, the fourth event subsequent to the third event, the fourth event to identify a fourth privilege level associated with the process; and permitting the execution of the process to proceed in response to the fourth privilege level being equal to the third privilege level.

20. The method of claim 18, further including:

detecting a fourth event associated with the execution of the process, the fourth event subsequent to the third event, the fourth event to identify a fourth privilege level associated with the process; and at least one of terminating, pausing or suspending the process in response to the fourth privilege level being higher than the third privilege level.

* * * * *